United States Patent [19]

Babinec

[11] Patent Number: 5,671,082
[45] Date of Patent: Sep. 23, 1997

[54] SINGLE COMPARTMENT SELF-ERASING ELECTROCHROMIC DEVICE

[75] Inventor: Susan J. Babinec, Midland, Mich.

[73] Assignee: The Dow Chemical Company, Midland, Mich.

[21] Appl. No.: 296,299

[22] Filed: Aug. 25, 1994

[51] Int. Cl.⁶ .................................................. G02F 1/153
[52] U.S. Cl. ............................................ 359/272; 359/270
[58] Field of Search .................................. 359/265, 270, 359/272

[56] References Cited

U.S. PATENT DOCUMENTS

| | | | |
|---|---|---|---|
| 3,283,656 | 11/1966 | Jones et al. | 88/107 |
| 3,451,741 | 6/1969 | Manos | 350/160 |
| 4,090,782 | 5/1978 | Bredfeldt et al. | 350/357 |
| 4,093,358 | 6/1978 | Shattuck et al. | 350/357 |
| 4,139,276 | 2/1979 | Clecak et al. | 350/357 |
| 4,443,057 | 4/1984 | Bauer et al. | 350/281 |
| 4,612,301 | 9/1986 | Currie et al. | 502/154 |
| 4,839,008 | 6/1989 | Hill | 204/157.15 |
| 4,864,041 | 9/1989 | Hill | 549/513 |
| 4,917,477 | 4/1990 | Bechtel et al. | 350/357 |
| 5,128,799 | 7/1992 | Byker | 359/265 |
| 5,142,407 | 8/1992 | Varaprasad et al. | 359/276 |
| 5,471,337 | 11/1995 | Babinec | 359/269 |

OTHER PUBLICATIONS

Byker, H. J., "Commercial Developments in Electrochromics", Abstract No. 387, (1993) *Electrochromics Symposium.*

Hill, C.L., "Catalytic Photochemical Dehydrogenation of Organic Substrates by Polyoxometalates", *J. Am. Chem. Soc.*, (1985) 107, 5148–5157.

Primary Examiner—Georgia Y. Epps
Assistant Examiner—Thomas Robbins
Attorney, Agent, or Firm—Timothy S. Stevens

[57] ABSTRACT

An electrochromic device comprising three elements. The first element is a first electrode. The second element is a second electrode. The second electrode is spaced apart from the first electrode so that there is a space between the first electrode and the second electrode. The third element is a dispersion positioned in the space. The dispersion is in electrical contact with the first electrode and with the second electrode. The dispersion comprises a transition metal surface substituted polyoxometalate and a solvent. The first and second electrodes can be a transparent electronically conducting layer of indium-tin oxide coated upon a panel of glass. The transition metal surface substituted polyoxometalate can be $Li_xMnPW_{11}O_{40}$. The dispersion is resistant to photodegradation such as discoloring in sunlight.

6 Claims, 1 Drawing Sheet

SINGLE COMPARTMENT SELF-ERASING ELECTROCHROMIC DEVICE

BACKGROUND

Single compartment self-erasing electrochromic devices were apparently first disclosed by Manos in U.S. Pat. No. 3,451,741. However, such devices were not commercially developed until the Byker device, U.S. Pat. No. 5,128,799, was commercialized by Gentex Corporation. Gentex Corporation has reportedly sold over two million of these devices in the form of interior rear view mirrors for automobiles. However, the electrochromically active compounds used in the Gentex device have limited photochemical stability. It would be an advance in this art if single compartment self-erasing liquid filled electrochromic devices could be developed that had better photochemical stability.

Polyoxometalates, including transition metal surface substituted polyoxometalates, are known to be electrochromically active, see U.S. patent application Ser. No. 08/015,965, filed Feb. 5, 1993 now U.S. Pat. No. 5,377,039 by Babinec. Polyoxometalates are also known to be photochemically active. For example Currie et al., U.S. Pat. No. 4,612,301 discloses polyoxometalates as photocatalysts for alcohol conversion. Polyoxometalates, including transition metal surface substituted polyoxometalates, can even be used for the photooxidation of alkanes, see claim 5 of U.S. Pat. No. 4,839,008 to Professor Hill.

SUMMARY OF THE INVENTION

The primary benefit of this invention is a solution to the above discussed photochemical stability problem. In this invention a transition metal surface substituted polyoxometalate is used in a dispersion filling the compartment of a single compartment self-erasing electrochromic device. Surprisingly, the transition metal surface substituted polyoxometalate is photochemically stable in this system.

More specifically, this invention is an electrochromic device comprising three elements. The first element is a first electrode. The second element is a second electrode. The second electrode is spaced apart from the first electrode so that there is a space between the first electrode and the second electrode. The third element is a dispersion positioned in the space. The dispersion is in electrical contact with the first electrode and the second electrode. The dispersion comprises a transition metal surface substituted polyoxometalate and a solvent.

DETAILED DESCRIPTION OF THE INVENTION

Figure 1:
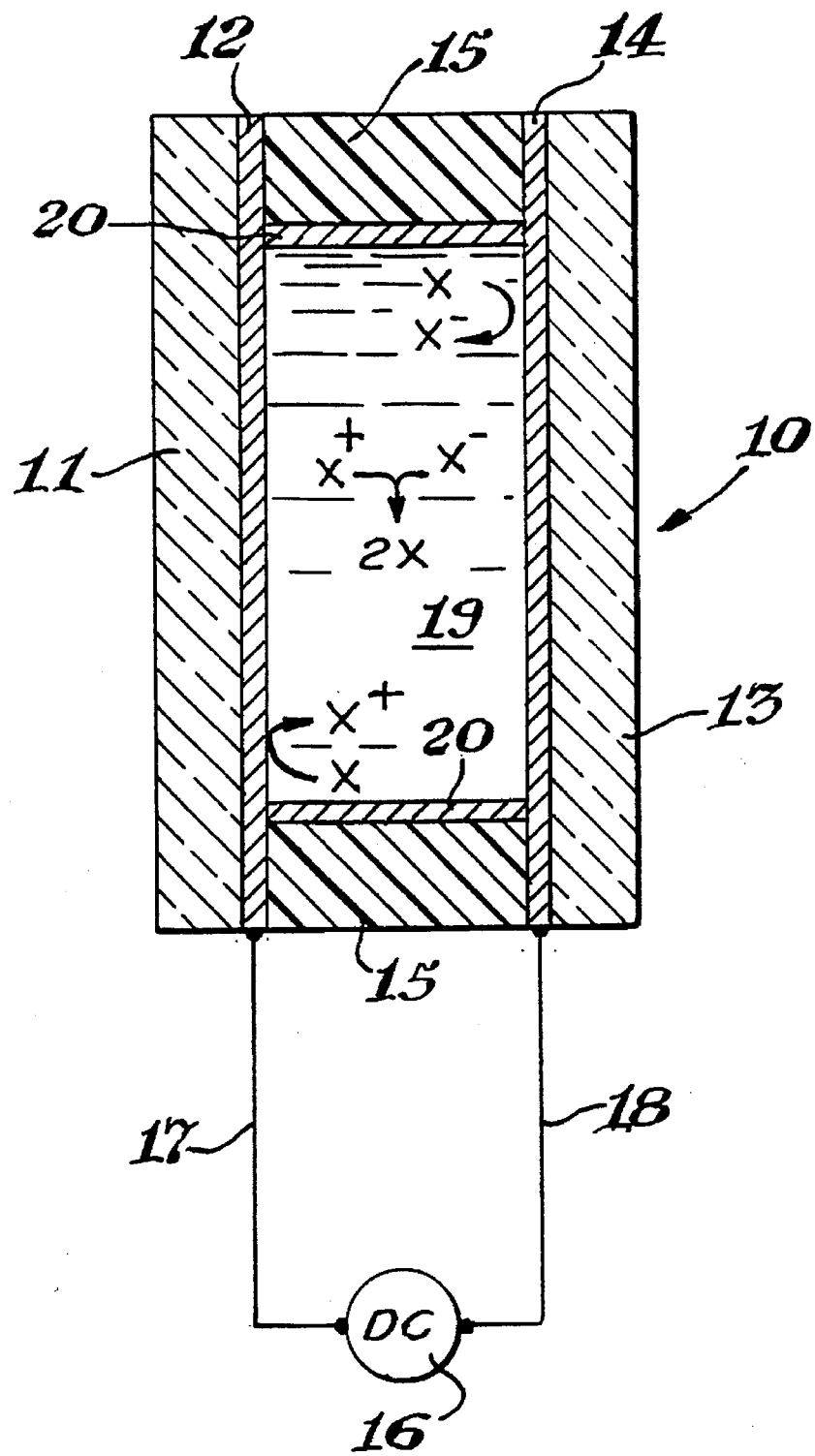
FIG. 1 is a cross-sectional view of a single compartment self-erasing electrochromic device filled with a dispersion incorporating a transition metal surface substituted polyoxometalate and a solvent.

Referring now to FIG. 1, therein is shown a cross-sectional view of a single compartment self-erasing electrochromic device 10. The device 10 includes a first pane of glass 11. The first pane of glass 11 is coated with a first layer of indium-tin oxide 12. Similarly, the device 10 includes a second pane of glass 13. The second pane of glass 13 is coated with a second layer of indium-tin oxide 14. The first and second panes of glass are spaced apart by a spacer or gasket 20. The marginal edges of the first and second panes of glass 11 and 13 are sealed with an epoxy sealant 15.

One terminal of a direct current electrical power supply 16 is connected to the first layer of indium-tin oxide 12 by a first wire 17. The other terminal of the direct current electrical power supply 16 is connected to the second layer of indium-tin oxide 14 by a second wire 18. The first layer of indium-tin oxide 12 is the first electrode of the device 10. Similarly, the second layer of indium-tin oxide 14 is the second electrode of the device 10.

The device 10 includes a space 19 between the first and second layers of indium-tin oxide 12 and 14. The space 19 is filled with a dispersion comprising a transition metal surface substituted polyoxometalate and a solvent, the dispersion being in electrical contact with the first and second layers of indium-tin oxide 12 and 14.

The term "polyoxometalate" means an isopoly anion or a heteropoly anion. Isopoly anions and heteropoly anions are well known, see for example Professor Pope's book entitled "Heteropoly and Isopoly Oxometalates" copyright date 1983. An isopoly anion is a metal oxide compound comprising oxygen and a metal selected from the group consisting of molybdenum VI, tungsten VI, vanadium V, niobium V and tantalum V. An example of an isopoly anion is $H_2W_{12}O_{40}^{-6}$. A heteropoly anion is a metal oxide compound comprising oxygen, an element such as phosphorus, arsenic, silicon, germanium, boron, aluminum or many first row transition metals, such as iron or cobalt and a metal selected from the group consisting of molybdenum VI, tungsten VI, vanadium V, niobium V and tantalum V. The heteroatoms are located at well defined sites within the polyoxometalate molecule at either the core or at the surface. Examples of heteropoly anions having the heteroatoms at the core are $PW_{12}O_{40}^{-3}$ and $FePW_{12}O_{39}^{-5}$.

The term "transition metal surface substituted polyoxometalate" means a polyoxometalate in which at least one of the surface metal atoms of the polyoxometalate is replaced with a transition metal, usually of the first transition series such as chromium, manganese, iron, cobalt, nickel, copper or zinc. Thus, in general the transition metal surface substituted polyoxometalates used in this invention are characterized by containing at least one transition metal encased or ligated at a surface site by several oxygen atoms which make up the metal oxide framework of the parent polyoxometalate structure.

A preferred transition metal surface substituted polyoxometalate of this invention is: $[(M)XW_sMo_vV_uO_{39}]^{-(z)}$; wherein s+u+t=11 and z=4 to 15; wherein X is selected from the group consisting of transition metal di and tri valent cations and tri, tetra and pentavalent non-transition metal cations; and wherein M is a transition metal ion with greater than 0 d electrons, more preferably M is manganese, iron or chromium. The counter ion or ions having the total valency of (z) can be comprised of any cation except an anion exchange resin. The book by Michael Thor Pope entitled Heteropoly and Isopoly Oxometalates, published by Springer-Verlag in 1983 will provide greater detail on the general subject of polyoxometalates. U.S. Pat. Nos. 4,864,041 and 4,839,008 to Professor Hill will also provide greater detail on this subject.

The transition metal surface substituted polyoxometalates of this invention can be made in accordance with the following general description. The parent polyoxometalate is dissolved in water and the pH adjusted until the appropriate defect of "lacunary" structure, as is well known in the art, becomes the thermodynamically predominant form. For example, the preparation of $PW_{11}O_{39}^{-7}$ is effected by adjusting an aqueous solution of $H_3PW_{12}O_{40}$ to a pH of about 6 with lithium carbonate or another such base. These reactions can be monitored quantitatively by $^{183}$W NMR spectroscopy.

This defect or lacunary structure need not be isolated but can be treated immediately with an aqueous solution or dispersion of an appropriate transition metal salt. Any common water soluble salt will suffice. For example, an aqueous solution of the hydrated cobalt II chloride can be used. Upon mixing the transition metal ion with the defect polyoxometalate, the transition metal is incorporated into the defect site reconstituting the approximate structure of the parent polyoxometalate with the transition metal ion taking the place of one of the original metal atoms, e.g., tungsten VI, of the original polyoxometalate. Similarly, these reactions can be run in substantially nonaqueous solutions. That is, these reactions are not limited to aqueous solutions.

Continuing with the example above, $PW_{11}O_{39}^{-7}$ reacts with manganese II to form $(MnII)PW_{11}O_{39}^{-5}$. The rate of incorporation of the transition metal into the defect structure depends on the d orbital occupancy of the transition metal. Reactions of defect polyoxometalates with cobalt II and manganese II, for example, are instantaneous at room temperature while the reaction with chromium III is slower. After transition metal addition, the solution is preferably filtered to remove solid impurities. U.S. Pat. No. 4,864,041 to Professor Hill, column 9, lines 12–60, discusses this subject and lists publications that will provide greater detail on the preparation of transition metal substituted polyoxometalates.

The term "dispersion" means a true solution on the molecular or ionic level or a colloidal dispersion or even a dispersion of particles larger than the colloidal dimension and includes dispersions in gelled solvents and dispersions in polymers plasticized by solvent. The term "solvent" means a conventional liquid solvent capable of dispersing the transition metal surface substituted polyoxometalate as well as a solid solvent capable of dispersing the transition metal surface substituted polyoxometalate such as a polyether or a polyalcohol polymer. However, the solid solvent can not be the anion exchanging polymeric matrix of U.S. patent application Ser. No. 08/015,965 filed Feb. 5, 1993 by Babinec.

The use of indium-tin oxide as the electrode material is not critical in this invention. However, indium-tin oxide is a highly preferred electrode material since it can be transparent, corrosion resistant and electronically conductive. However, almost any electronically conducting material can be used as an electrode in this invention. Examples of various electrode materials that can be used include various metals and preferably the more noble metals such as gold, silver, rhodium, palladium, or platinum. When the electrochromic device desired is an electrochromic window, then both electrodes are usually transparent, e.g., a thin layer of gold. When the electrochromic device desired is an electrochromic display or mirror, then only one electrode is usually transparent.

Referring again to FIG. 1, transition metal surface substituted polyoxometalate, X, is shown as being oxidized at the first layer of indium-tin oxide 12 to form $X^+$. The oxidized transition metal surface substituted polyoxometalate, $X^+$, is generally colored differently, e.g., red, than the X form, e.g., light yellow. FIG. 1 also shows transition metal surface substituted polyoxometalate being reduced at the second layer of indium-tin oxide 14 to form $X^-$. The reduced transition metal surface substituted polyoxometalate, $X^-$, is also generally colored differently, e.g., blue. The term "electrical contact" means that the transition metal surface substituted polyoxometalate of the dispersion is sufficiently exposed to the electrodes so that the above referred to oxidation and reduction reactions can occur if a sufficient voltage is applied between the electrodes. In this regard, it is generally desirable to incorporate a supporting electrolyte into the dispersion of the instant invention to reduce the electrical resistance (IR drop) of the solution between the electrodes. The total voltage required to drive the color forming reaction includes: (a) the thermodynamic voltage difference between the $X^+$ and $X^-$ states; (b) the IR drop of the solution; (c) the kinetic overvoltage which drives the reaction at a rate faster than equilibrium; and (d) the concentration gradient overvoltage.

Referring still to FIG. 1, the oxidized transition metal surface substituted polyoxometalate, $X^+$, and the reduced transition metal surface substituted polyoxometalate, $X^-$, diffuse towards the center of the space 19 and react to form two transition metal surface substituted polyoxometalates, 2X. Thus, when the direct current electrical power supply 16 is turned off, then the device 10 generally begins to transmit more light, i.e., to self erase.

The spacing between the first and second electrodes is not critical in the instant invention. However it should be understood that if the spacing is made greater, all other factors the same, then the device can be made to transmit less light and it will also take longer to self erase. The spacing between the first and second electrodes can be as little as ten micrometers or even less. On the other hand, the spacing between the first and second electrodes can as much as one or two millimeters or more. In the test device discussed below in Example 2, the spacing is about seventy micrometers.

The voltage applied between the first and second electrodes is also not critical in the operation of the device of this invention. However, for the device of this invention to darken the voltage applied between the first and second electrodes must be sufficient to oxidize and reduce the transition metal surface substituted polyoxometalate. It should also be understood and will be understood by persons of ordinary skill in the art of electrochromic devices that if the voltage applied between the first and second electrodes is excessive, then undesirable reactions can occur at the first or second electrode which can shorten the useful life of the device just as much as undesirable photo induced reactions if the dispersion were not photostable in sunlight.

The polarity of the voltage applied between the first and second electrodes is not critical in the operation of the device of this invention. Although the device of this invention is self-erasing, reversing the polarity of the applied voltage for a relatively short time can reduce the time needed to erase the device. However, if an excessive reverse polarity of the applied voltage is used or if a reverse polarity is applied for too long a time, then the device will, of course, not erase but will instead become dark again or effectively remain dark. Applying zero volts to the electrodes or short circuiting the electrodes is an effective means for improving the self-erasing time.

The specific solvent used in this invention is not critical and can be generally selected from the group consisting of alcohols, ethers, amides, amines, esters, carbonates, nitriles, water, nitrated hydrocarbons, inorganic acids, inorganic bases, organic acids, hydrocarbons, sulfones and sulfolanes, aldehydes, ketones and chlorinated hydrocarbons. Propylene carbonate is a highly preferred solvent. Obviously, mixtures of solvents can be used, e.g., it is often desirable to add from one to five percent water to a propylene carbonate based dispersion.

The dispersion of the instant invention can also be thickened with a thickening agent. The term "thickening agent" means a material which when added to the dispersion increases the viscosity of the dispersion. Generally, the use of a thickening agent in the dispersion decreases the rate of diffusion of the oxidized and reduced transition metal surface substituted polyoxometalates in the space which in turn can allow the use of a thinner space between the first and second electrodes. A highly preferred thickening agent in the instant invention is poly(methylmethacrylate). Another thickening agent that is effective in this invention is a perfluorosulfonic acid polymer.

The concentration of the transition metal surface substituted polyoxometalate is not critical in this invention. However it is generally preferable to use a dispersion which is nearly but not completely saturated with the transition metal surface substituted polyoxometalate.

EXAMPLE 1

This example will teach the preparation of a transition metal surface substituted polyoxometalate according to a preferred embodiment of this invention. $Li_xMnPW_{11}O_{39}$ is prepared by the following procedure. Dissolve twenty nine grams of $H_3PW_{12}O_{40}$ (available from Aldrich Chemical Co., Milwaukee, Wis.) in one hundred milliliters of water and heat to fifty degrees centigrade. Stir and titrate to a pH of 5.45 with solid lithium carbonate. Determine the pH during the titration by withdrawing an aliquot of the solution, cooling it to room temperature and then measuring its pH using a pH electrode and meter. Return the aliquot to the original solution. Repeat the above steps until the measured pH is 5.45. Continue stirring and slowly add one and nine tenths gram of solid manganese sulfate. Increase the temperature of the solution to ninety degrees centigrade, add one hundred and fifty milliliters of ninety degree centigrade water and then filter. Then cool the filtrate to room temperature and evaporate off the water to recover the $Li_xMnPW_{11}O_{39}$.

EXAMPLE 2

This example will teach a manufacturing method for spaced electrodes according to a preferred embodiment of this invention. Two one hundred millimeter by one hundred millimeter panels of indium-tin oxide coated glass, indium-tin oxide sides facing one another (available as PD5002 from the Donnelly Corporation of Holland, Mich.) are spaced apart about seventy five micrometers by seventy five micrometer thick polyethylene gasket strips positioned near the edges of the glass panels. Epoxy resin is applied to the edges of the glass panels to seal them together. However two gaps are left in the epoxy seal and polyethylene gasket on opposite edges of the glass panels so that the space between the glass panels can be filled with the dispersion of Example 3 below. In addition, the glass panels are slightly translated with respect to each other to allow electrical contact with the indium-tin oxide layers.

EXAMPLE 3

This example will teach the preparation of a dispersion according to a preferred embodiment of this invention. The dispersion contains three percent $Li_xMnPW_{11}O_{39}$ (from Example 1 above), one tenth percent lithium perchlorate as a supporting electrolyte, ten percent poly(methylmethacrylate) as a thickening agent, one percent water as a solvent modifier and a primary solvent of propylene carbonate. The dispersion is heated to forty five degrees centigrade in a heated ultrasonic bath. The dispersion is centrifuged and then filtered to remove particulates. Nitrogen gas is then bubbled through the filtered dispersion for ten minutes to remove oxygen from the dispersion.

EXAMPLE 4

This example will teach the preparation of an electrochromic device according to a preferred embodiment of this invention. The apparatus of Example 2 is filled with the dispersion of Example 3 by way of the two gaps left in the apparatus as discussed in Example 2. The two gaps are then sealed with more epoxy resin.

EXAMPLE 5

This example will teach the operation of the device of Example 4. Two and seven tenths volt is applied across the indium-tin oxide layers for thirty seconds and the device darkens two hundredths of an absorbance unit at a light wavelength of six hundred and thirty two nanometers, the test wavelength used to determine absorbance for each Example hereafter. Thirty seconds later at zero applied volts, the device has self erased two hundredths of an absorbance unit. Two and eight tenths volt is applied across the indium-tin oxide layers for thirty seconds and the device darkens four hundredths of an absorbance unit. Thirty seconds later at zero applied volts, the device has self erased four hundredths of an absorbance unit. Two and nine tenths volt is applied across the indium-tin oxide layers for thirty seconds and the device darkens sixteen hundredths of an absorbance unit. Thirty seconds later at zero applied volts, the device has self erased twelve hundredths of an absorbance unit. A three volt electrical potential is applied across the indium-tin oxide layers for thirty seconds and the device darkens thirty five hundredths of an absorbance unit. Five minutes later at zero applied volts, the device has self erased seven hundredths of an absorbance unit.

EXAMPLE 6

The dispersion of Example 5 is changed to a dispersion of ten percent $K_xMnPW_{11}O_{39}$ (from Example 1 above), one half percent eight hundred equivalent weight perfluorosulfonic acid (as the dispersion of Example 1 of U.S. Pat. No. 5,124,080) as the supporting electrolyte and a primary solvent of water. Nine tenths volt is applied across the indium-tin oxide layers for thirty seconds and the device darkens four hundredths of an absorbance unit. Thirty seconds later at zero applied volts, the device has self erased four hundredths of an absorbance unit. One volt is applied across the indium-tin oxide layers for thirty seconds and the device darkens ten hundredths of an absorbance unit. Thirty seconds later at zero applied volts, the device has self erased five hundredths of an absorbance unit. One and one tenth volt is applied across the indium-tin oxide layers for thirty seconds and the device darkens thirteen hundredths of an absorbance unit. Thirty seconds later at zero applied volts, the device has self erased four hundredths of an absorbance unit. One and two tenths volt is applied across the indium-tin oxide layers for thirty seconds and the device darkens nineteen hundredths of an absorbance unit. Five minutes later at zero applied volts, the device has self erased seventeen hundredths of an absorbance unit.

EXAMPLE 7

The dispersion of Example 6 is changed to a dispersion of ten percent $K_xFePW_{11}O_{39}$, one half percent eight hundred equivalent weight perfluorosulfonic acid (as the dispersion of Example 1 of U.S. Pat. No. 5,124,080) as the supporting electrolyte and a primary solvent of water. Two and six tenths volt is applied across the indium-tin oxide layers for thirty seconds and the device darkens eight hundredths of an absorbance unit. Thirty seconds later at zero applied volts, the device has self erased five hundredths of an absorbance unit. Two and seven tenths volt is applied across the indium-tin oxide layers for thirty seconds and the device darkens twenty three hundredths of an absorbance unit. Thirty seconds later at zero applied volts, the device has self erased nineteen hundredths of an absorbance unit. Two and eight tenths volt is applied across the indium-tin oxide layers for thirty seconds and the device darkens fifty eight hundredths of an absorbance unit. Thirty seconds later at zero applied volts, the device has self erased fifty one hundredths of an absorbance unit.

EXAMPLE 8

The dispersion of Example 7 is changed to a dispersion of ten percent $Li_xMnPW_{11}O_{39}$, one tenth percent lithium perchlorate as the supporting electrolyte, five percent water as a solvent modifier and a primary solvent of propylene carbonate. Two volts is applied across the indium-tin oxide layers for thirty seconds and the device darkens twenty four hundredths of an absorbance unit. Thirty seconds later at zero applied volts, the device has self erased seventeen hundredths of an absorbance unit. Two and one tenth volt is applied across the indium-tin oxide layers for thirty seconds and the device darkens thirty four hundredths of an absorbance unit. Thirty seconds later at zero applied volts, the device has self erased twenty one hundredths of an absorbance unit. Two and two tenths volt is applied across the indium-tin oxide layers for thirty seconds and the device darkens forty three hundredths of an absorbance unit. Thirty seconds later at zero applied volts, the device has self erased nineteen hundredths of an absorbance unit. Five minutes later at zero applied volts, the device has self erased forty three hundredths of an absorbance unit.

EXAMPLE 9

The dispersion of Example 8 is changed to a dispersion of ten percent $Li_xCoPW_{11}O_{39}$, one tenth percent lithium perchlorate as the supporting electrolyte, five percent water as a solvent modifier, ten percent poly(methylmethacrylate) as a thickener and a primary solvent of dimethylformamide. Two and three tenths volt is applied across the indium-tin oxide layers for thirty seconds and the device darkens five hundredths of an absorbance unit. Thirty seconds later at zero applied volts, the device has self erased four hundredths of an absorbance unit. Two and four tenths volt is applied across the indium-tin oxide layers for thirty seconds and the device darkens fourteen hundredths of an absorbance unit. Thirty seconds later at zero applied volts, the device has self erased seven hundredths of an absorbance unit. Two and five tenths volt is applied across the indium-tin oxide layers for thirty seconds and the device darkens twenty six hundredths of an absorbance unit. Thirty seconds later at zero applied volts, the device has self erased six hundredths of an absorbance unit. Two and six tenths volt is applied across the indium-tin oxide layers for thirty seconds and the device darkens thirty seven hundredths of an absorbance unit. Thirty seconds later at zero applied volts, the device has self erased three hundredths of an absorbance unit. Ten minutes later at zero applied volts, the device has self erased twenty three hundredths of an absorbance unit.

EXAMPLE 10

The dispersion of Example 9 is changed to a dispersion of ten percent $Li_xFePW_{11}O_{39}$, one tenth percent lithium perchlorate as the supporting electrolyte, five percent water as a solvent modifier, ten percent poly(methylmethacrylate) as a thickener and a primary solvent of dimethylformamide. An electrical potential of three volts is applied across the indium-tin oxide layers for two minutes and the device darkens three hundredths of an absorbance unit. Thirty seconds later at zero applied volts, the device has self erased one hundredths of an absorbance unit. An electrical potential of three volts is applied across the indium-tin oxide layers for five minutes and the device darkens thirteen hundredths of an absorbance unit. Two minutes later at zero applied volts, the device has self erased eleven hundredths of an absorbance unit.

EXAMPLE 11

The dispersion of Example 10 is changed to a dispersion of ten percent $Li_xCuPW_{11}O_{39}$, one tenth percent lithium perchlorate as the supporting electrolyte, five percent water as a solvent modifier, ten percent poly(methylmethacrylate) as a thickener and a primary solvent of dimethylformamide. An electrical potential of two and eight tenths volt is applied across the indium-tin oxide layers for thirty seconds and the device darkens thirty two hundredths of an absorbance unit. Thirty seconds later at zero applied volts, the device has self erased two hundredths of an absorbance unit. Ten minutes later at zero applied volts, the device has self erased four hundredths of an absorbance unit. Fifteen minutes later at zero applied volts, the device has still self erased only four hundredths of an absorbance unit. It is noted that the indium-tin oxide coating appears to be stained.

EXAMPLE 12

The dispersion of Example 10 is changed to a dispersion of ten percent $Li_xNiPW_{11}O_{39}$, one tenth percent lithium perchlorate as the supporting electrolyte, four percent water as a solvent modifier, ten percent poly(methylmethacrylate) as a thickener and a primary solvent of propylene carbonate. An electrical potential of two and four tenths volt is applied across the indium-tin oxide layers for thirty seconds and the device darkens five hundredths of an absorbance unit. Thirty seconds later at zero applied volts, the device has self erased five hundredths of an absorbance unit. An electrical potential of two and five tenths volt is applied across the indium-tin oxide layers for thirty seconds and the device darkens twelve hundredths of an absorbance unit. Thirty seconds later at zero applied volts, the device has self erased four hundredths of an absorbance unit. An electrical potential of two and six tenths volt is applied across the indium-tin oxide layers for thirty seconds and the device darkens fourteen hundredths of an absorbance unit. Thirty seconds later at zero applied volts, the device has self erased three hundredths of an absorbance unit. An electrical potential of two and seven tenths volt is applied across the indium-tin oxide layers for thirty seconds and the device darkens nineteen hundredths of an absorbance unit. Thirty seconds later at zero applied volts, the device has self erased two hundredths of an absorbance unit. An electrical potential of two and eight tenths volt is applied across the indium-tin oxide layers for thirty seconds and the device darkens twenty five hundredths of an absorbance unit. Thirty seconds later at zero applied volts, the device has self erased three hundredths of an absorbance unit. An electrical potential of two and nine tenths volt is applied across the indium-tin oxide layers for thirty seconds and the device darkens thirty two hundredths of an absorbance unit. Thirty seconds later at zero applied volts, the device has self erased four hundredths of an absorbance unit. Three volts is applied across the indium-tin oxide layers for thirty seconds and the device darkens thirty five hundredths of an absorbance unit. Thirty seconds later at zero applied volts, the device has self erased two hundredths of an absorbance unit. Five minutes later at zero applied volts, the device has self erased fifteen hundredths of an absorbance unit. Twenty minutes later at zero applied volts, the device has self erased twenty seven hundredths of an absorbance unit.

EXAMPLE 13

The dispersion of Example 10 is changed to a dispersion of ten percent $Li_xZnPW_{11}O_{39}$, one tenth percent lithium perchlorate as the supporting electrolyte, ten percent poly(methylmethacrylate) as a thickener and a primary solvent of dimethylformamide. An electrical potential of two and eight tenths volt is applied across the indium-tin oxide layers for thirty seconds and the device darkens seven hundredths of an absorbance unit. Thirty seconds later at zero applied volts, the device has self erased zero hundredths of an absorbance unit. An electrical potential of two and nine tenths volt is applied across the indium-tin oxide layers for thirty seconds and the device darkens sixteen hundredths of an absorbance unit. Thirty seconds later at zero applied volts, the device has self erased two hundredths of an absorbance unit. An electrical potential of three volts is applied across the indium-tin oxide layers for thirty seconds and the device darkens twenty four hundredths of an absorbance unit. Thirty seconds later at zero applied volts, the device has self erased one hundredths of an absorbance unit. Twenty minutes later at zero applied volts, the device has self erased five hundredths of an absorbance unit.

EXAMPLE 14

The dispersion of Example 10 is changed to a dispersion of ten percent $Li_xNiPW_{11}O_{39}$, one tenth percent lithium perchlorate as the supporting electrolyte, ten percent poly(methylmethacrylate) as a thickener and a primary solvent of dimethylformamide. An electrical potential of two and five tenths volt is applied across the indium-tin oxide layers for thirty seconds and the device darkens five hundredths of an absorbance unit. Thirty seconds later at zero applied volts, the device has self erased two hundredths of an absorbance unit. An electrical potential of two and six tenths volt is applied across the indium-tin oxide layers for thirty seconds and the device darkens eleven hundredths of an absorbance unit. Thirty seconds later at zero applied volts, the device has self erased three hundredths of an absorbance unit. An electrical potential of two and seven tenths volt is applied across the indium-tin oxide layers for thirty seconds and the device darkens seventeen hundredths of an absorbance unit. Thirty seconds later at zero applied volts, the device has self erased three hundredths of an absorbance unit. An electrical potential of two and eight tenths volt is applied across the indium-tin oxide layers for thirty seconds and the device darkens twenty five hundredths of an absorbance unit. Thirty seconds later at zero applied volts, the device has self erased four hundredths of an absorbance unit. An electrical potential of two and nine tenths volt is applied across the indium-tin oxide layers for thirty seconds and the device darkens thirty eight hundredths of an absorbance unit. Thirty seconds later at zero applied volts, the device has self erased one hundredth of an absorbance unit. An electrical potential of three volts is applied across the indium-tin oxide layers for thirty seconds and the device darkens sixty four hundredths of an absorbance unit. Five minutes later at zero applied volts, the device has self erased nine hundredths of an absorbance unit. Twenty minutes later at zero applied volts, the device has self erased twenty eight hundredths of an absorbance unit.

EXAMPLE 15

The dispersions of Examples 5–14 are placed three inches from a Dymax Light Welder PC-2 ultraviolet light source for six hundred seconds without evidence of photodegradation, i.e., without turning blue. In addition, the dispersions of Examples 5–14 above do not turn blue when placed in full sunlight for several days. By way of comparison, if the $Li_xNiPW_{11}O_{39}$ of Example 14 is replaced with $Li_xPW_{12}O_{40}$, then the mixture turns dark blue in less than sixty seconds under the Dymax Light Welder and in about sixty minutes in full sunlight.

What is claimed is:

1. A photostable electrochromic device comprising:

(a) a first electrode;

(b) a second electrode, the second electrode spaced apart from the first electrode so that there is a space between the first electrode and the second electrode; and (c) a dispersion positioned in the space between the first electrode and the second electrode, the dispersion being in electrical contact with the first electrode and with the second electrode, the dispersion comprising a transition metal surface substituted polyoxometalate and a solvent.

2. The electrochromic device of claim 1 wherein the solvent is a liquid solvent.

3. The electrochromic device of claim 2 wherein the liquid solvent is selected from the group consisting of alcohols, ethers, amides, amines, esters, carbonates, nitriles, water, nitrated hydrocarbons, inorganic acids, inorganic bases, organic acids, hydrocarbons, sulfones and sulfolanes, aldehydes, ketones and chlorinated hydrocarbons.

4. The electrochromic device of claim 3 the dispersion further comprising a thickening agent.

5. The electrochromic device of claim 2 the dispersion further comprising a thickening agent.

6. The electrochromic device of claim 1 wherein the solvent is a solid solvent.

* * * * *